(12) United States Patent
Prehofer

(10) Patent No.: US 8,966,390 B2
(45) Date of Patent: Feb. 24, 2015

(54) METHOD AND APPARATUS FOR VISUALLY INDICATING LOCATION PROBABILITY

(75) Inventor: Christian Prehofer, Ruuick (DE)

(73) Assignee: Nokia Corporation, Espoo (FI)

(*) Notice: Subject to any disclaimer, the term of this patent is extended or adjusted under 35 U.S.C. 154(b) by 783 days.

(21) Appl. No.: 12/649,165

(22) Filed: Dec. 29, 2009

(65) Prior Publication Data
US 2011/0161855 A1    Jun. 30, 2011

(51) Int. Cl.
| | |
|---|---|
| G01C 21/34 | (2006.01) |
| G06F 3/048 | (2013.01) |
| H04M 1/725 | (2006.01) |
| G01C 21/20 | (2006.01) |
| H04W 4/04 | (2009.01) |

(52) U.S. Cl.
CPC ......... *H04M 1/72572* (2013.01); *G01C 21/206* (2013.01); *H04W 4/04* (2013.01)
USPC ............ 715/772; 701/418; 701/434; 455/457

(58) Field of Classification Search
USPC .......... 715/734, 771; 701/418, 434, 538, 411; 342/450, 451
See application file for complete search history.

(56) References Cited

U.S. PATENT DOCUMENTS

| | | | | |
|---|---|---|---|---|
| 5,608,635 | A * | 3/1997 | Tamai ........................... | 701/428 |
| 7,126,951 | B2 * | 10/2006 | Belcea et al. ................. | 370/400 |
| 7,203,497 | B2 * | 4/2007 | Belcea ........................... | 455/446 |
| 7,616,965 | B2 * | 11/2009 | Rudravaram et al. ....... | 455/456.1 |
| 7,640,025 | B2 * | 12/2009 | Zhao ........................... | 455/456.1 |
| 2004/0259575 | A1 | 12/2004 | Perez-Breva et al. | |
| 2005/0048987 | A1 * | 3/2005 | Glass ........................ | 455/456.1 |
| 2005/0176406 | A1 * | 8/2005 | Krishnakumar et al. ..... | 455/410 |
| 2006/0019679 | A1 * | 1/2006 | Rappaport et al. ......... | 455/456.5 |
| 2008/0165060 | A1 * | 7/2008 | Songer et al. ................. | 342/451 |
| 2008/0281515 | A1 * | 11/2008 | Ann et al. ...................... | 701/210 |
| 2009/0156230 | A1 * | 6/2009 | Versteeg .................... | 455/456.1 |
| 2009/0187337 | A1 * | 7/2009 | Denk, Jr. ....................... | 701/201 |
| 2010/0311436 | A1 | 12/2010 | Bevan et al. | |

FOREIGN PATENT DOCUMENTS

| | | | |
|---|---|---|---|
| GB | 2352134 A | * | 1/2001 |
| WO | WO 2008/069446 A1 | | 6/2008 |
| WO | WO 2011/019125 A1 | | 2/2011 |

OTHER PUBLICATIONS

King, T. et al., *On-Demand Fingerprint Selection for 802.11-based Positioning Systems*, IEEE, 2008, 8 pages.
Swangmuang et al., *Location Fingerprint Analyses Toward Efficient Indoor Positioning*, Sixth Annual IEEE International Conference on Pervasive Computing and Communications, (2008), pp. 100-109.
International Search Report and Written Opinion for Application No. PCT/IB2010/055139 dated Nov. 12, 2010.

* cited by examiner

*Primary Examiner* — Kieu Vu
*Assistant Examiner* — Blaine Basom
(74) *Attorney, Agent, or Firm* — Alston & Bird LLP

(57) ABSTRACT

A method and apparatus are provided for visually indicating location probability, particularly in a multi-level, three-dimensional environment. In general, a method of a graphical user interface may be provided that displays the uncertain location of a device within an environment in an easily discernable format. A method may be provided that includes providing for transmission of a location request from a first location within an environment and receiving at least two potential locations that are within the environment. The method may further include providing for display of a graphical representation of the environment including visual indicators of the potential locations within the graphical representation of the environment and receiving an indication that a potential location corresponds to the first location. Each visual indicator may convey the accuracy confidence level for each respective location.

25 Claims, 11 Drawing Sheets

METHOD AND APPARATUS FOR VISUALLY INDICATING LOCATION PROBABILITY

TECHNOLOGICAL FIELD

Embodiments of the present invention relate generally to computing technology and, more particularly, relate to methods and apparatus for visually indicating location probability.

BACKGROUND

Many types of computing and/or communications devices are capable of providing a wide array of functions while the devices move from place to place. These devices will be generically referenced herein as "mobile devices." For a variety of reasons, it may be advantageous for a mobile device to be able to determine its current location, or to determine a number of possible locations. For example, some mobile devices execute applications, such as calendars, reminders, navigation assistants, and communication tools having functionality that may be altered or enhanced depending upon the location of the mobile device.

Most outdoor positioning systems use a Global Positioning System (GPS), which computes a device's position by triangulating distance to a set of satellites. The GPS infrastructure includes a constellation of satellites and ground tracking stations and depends upon published updates of satellite ephemerides. In order to determine its position, a mobile device may include a GPS receiver having a radio for receiving GPS satellite transmissions as well as sufficient computation and storage resources to estimate its geo-referenced latitude, longitude, and elevation (LLE). The LLE of a mobile device may be more easily viewed in the context of a map. Because optimum GPS performance generally occurs in outdoor regions with substantial sky visibility, it is desirable to have alternatives for environments that are typically incompatible with GPS.

BRIEF SUMMARY

A method, apparatus, and computer program product are therefore provided for visually indicating location probability, particularly in a multi-level, three-dimensional environment. In general, example embodiments of the present invention provide an improvement by, among other things, providing a method of a graphical user interface that displays the uncertain location of a device within an environment in an easily discernable format such that a user may be able to determine their location more easily.

In one embodiment of the present invention, a method is provided that includes providing for transmission of a location request from a first location within an environment and receiving at least two potential locations that are within the environment. The method may further include providing for display of a graphical representation of the environment including visual indicators of the potential locations within the graphical representation of the environment and receiving an indication that a potential location corresponds to the first location. The location request may include a wireless fingerprint corresponding to the first location and the first location may be within a multi-level building. The graphical representation of the environment may include graphical representations of at least two levels of the multi-level building. One of the potential locations may be displayed on a level that is different from at least one other potential location. Each of the visual indicators may include at least one visual cue that represents a confidence level for each of the respective potential locations where that visual cue may include the opacity of the visual indicator or the color of the visual indicator.

According to another embodiment of the invention, an apparatus is provided that includes at least one processor and at least one memory including computer program code. The at least one memory and the computer program code are configured to, with the at least one processor, cause the apparatus to provide for transmission of a location request from a first location within an environment and receive at least two potential locations within the environment. The apparatus may further be caused to provide for display of a graphical representation of the environment including a visual indicator for each of the potential locations within the graphical representation of the environment and receive an indication that a potential location corresponds to the first location. The location request may include a wireless fingerprint corresponding to the first location and the first location may be within a multi-level building. The graphical representation of the environment may include graphical representations of at least two levels of the multi-level building. At least one potential location may be displayed on a level that is different from at least one other potential location. Each of the visual indicators may include at least one visual cue that represents a confidence level for each of the respective potential locations. The visual cue may include the opacity of the visual indicator or it may include the color of the visual indicator.

According to yet another embodiment of the invention, a computer program product is provided that includes at least one computer-readable storage medium having computer-executable program code instructions stored therein. The computer-executable program code instructions of this embodiment include program code instructions for providing for transmission of a location request from a first location within an environment and program code instructions for receiving at least two potential locations that are within the environment. The computer-executable program code instructions may further include program code instructions for providing for display of a graphical representation of the environment including a visual indicator for each of the potential locations within the graphical representation of the environment and program code instructions for receiving an indication that a potential location corresponds to the first location. The location request may comprise a wireless fingerprint that corresponds to the first location. The first location may be within a multi-level building and the graphical representation of the environment may include graphical representations of at least two levels of the multi-level building. At least one potential location may be displayed on a level that is different than at least one other potential location. Each of the visual indicators may include at least one visual cue that represents a confidence level for each of the respective potential locations where the visual cue may include the opacity of the visual indicator or the color of the visual indicator.

BRIEF DESCRIPTION OF THE SEVERAL VIEWS OF THE DRAWING(S)

Having thus described embodiments of the invention in general terms, reference now will be made to the accompanying drawings, which are not necessarily drawn to scale, and wherein:

DETAILED DESCRIPTION

Figure 1:
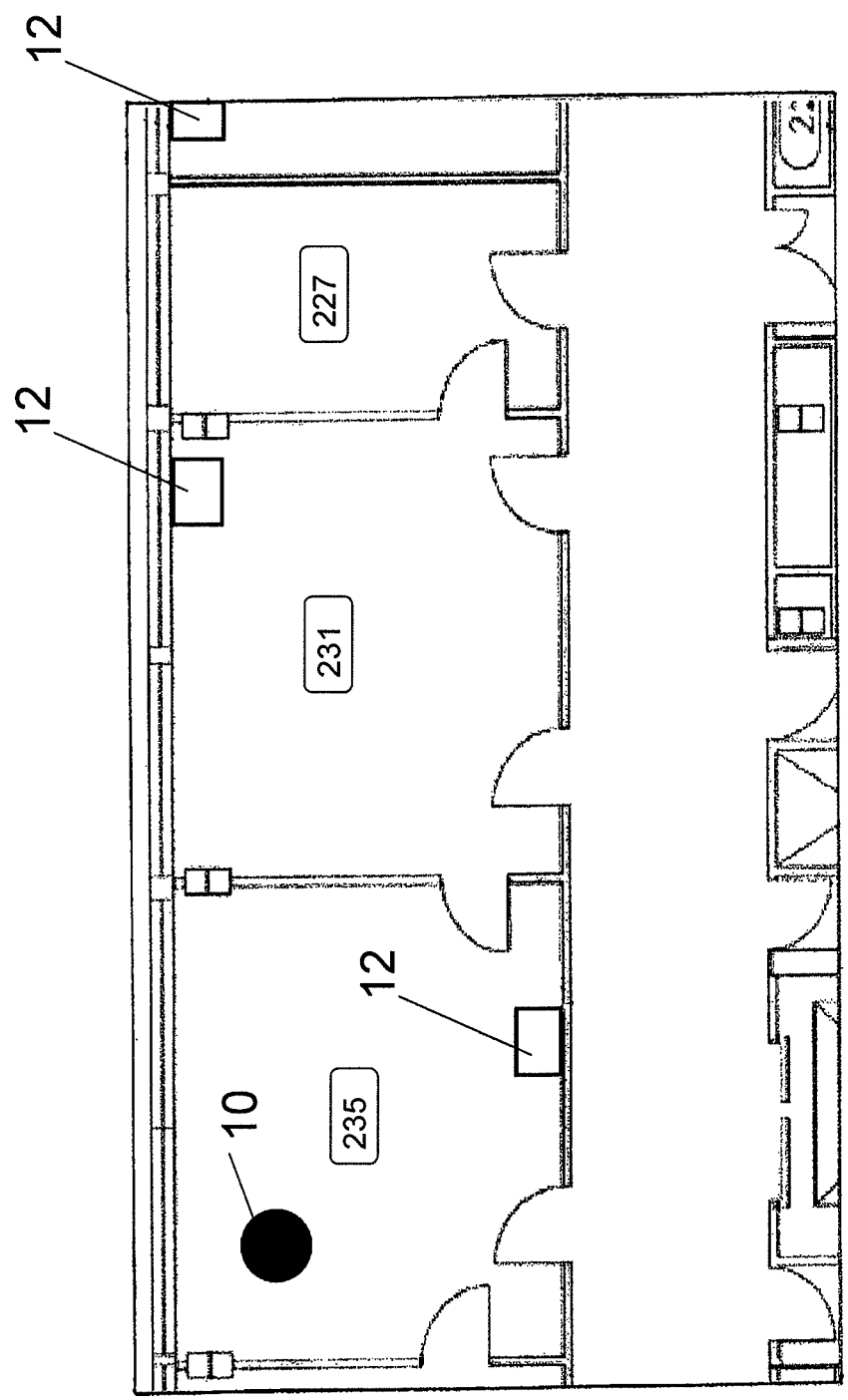
FIG. 1 is a schematic floor plan of a portion of a building illustrating a mobile device and a plurality of signal sources.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 depicts the floor plan of a portion of building. As shown, the building is divided into a number of spaces by walls, doors, windows and the like. In accordance with embodiments of the present invention, a mobile device 10 within the building may advantageously determine its location, such as in terms of the room in which the mobile device is currently located. As explained below, the mobile device may identify a wireless fingerprint present at its current geographical location and, based upon this wireless fingerprint and its association with a predefined geographical location, may determine its current location to be the predefined geographical location with which the wireless fingerprint has been previously associated. By way of example, FIG. 1 depicts three wireless signal sources 12, such as access points for a wireless local area network or the like, that emit wireless signals that combine to define the wireless fingerprint detected by the mobile device in room 235.

Localization may be performed in an indoor environment through fingerprint-based localization that characterizes the spatial variation available in radio signals, such as 802.11 and cellular broadcasts and compiling this information on to a virtual map. Each mobile device can then estimate its location by identifying the space within the map whose fingerprint most closely match any fingerprint recently observed by the device. Fingerprint-based localization may be preferable over radio maps as radio maps can experience large errors indoors due to multi-path effects.

Localization may also be performed "off-device" by access points or a server in an environment monitoring signals transmitted from a device (e.g., from a particular MAC or IP address) and using the information garnered to approximate the position of the device within the environment. Such localization may be performed outside of the mobile device. A device may transmit a request for the device location, whereupon the server or access point receiving the request may determine the distance of the device to surrounding access points, based upon the device's signal strength at each access point, to estimate the device location.

The accuracy with which a mobile device may be located may be dependent upon the method of locating and the number of signal sources or access points that are available to the mobile device. In environments with a relatively high number of signal sources, a mobile device may be able to more accurately determine its location; however, too many signal sources may create a 'noisy' fingerprint that closely resembles other 'noisy' fingerprints undermining the accuracy of the location. Alternatively, environments with a low number of signal sources may provide a mobile device with less accuracy in determining location. Off-device localization and fingerprint localization may suffer from similar inaccuracies. Accuracy may only be within 10 to 60 meters using Wireless Local Area Network access points in some environments while it may be only within 120 meters when using indoor cellular identification base stations. With accuracy of these levels, it may not be possible to determine with absolute certainty the location of a mobile device, particularly in a multi-level environment.

Figure 2:
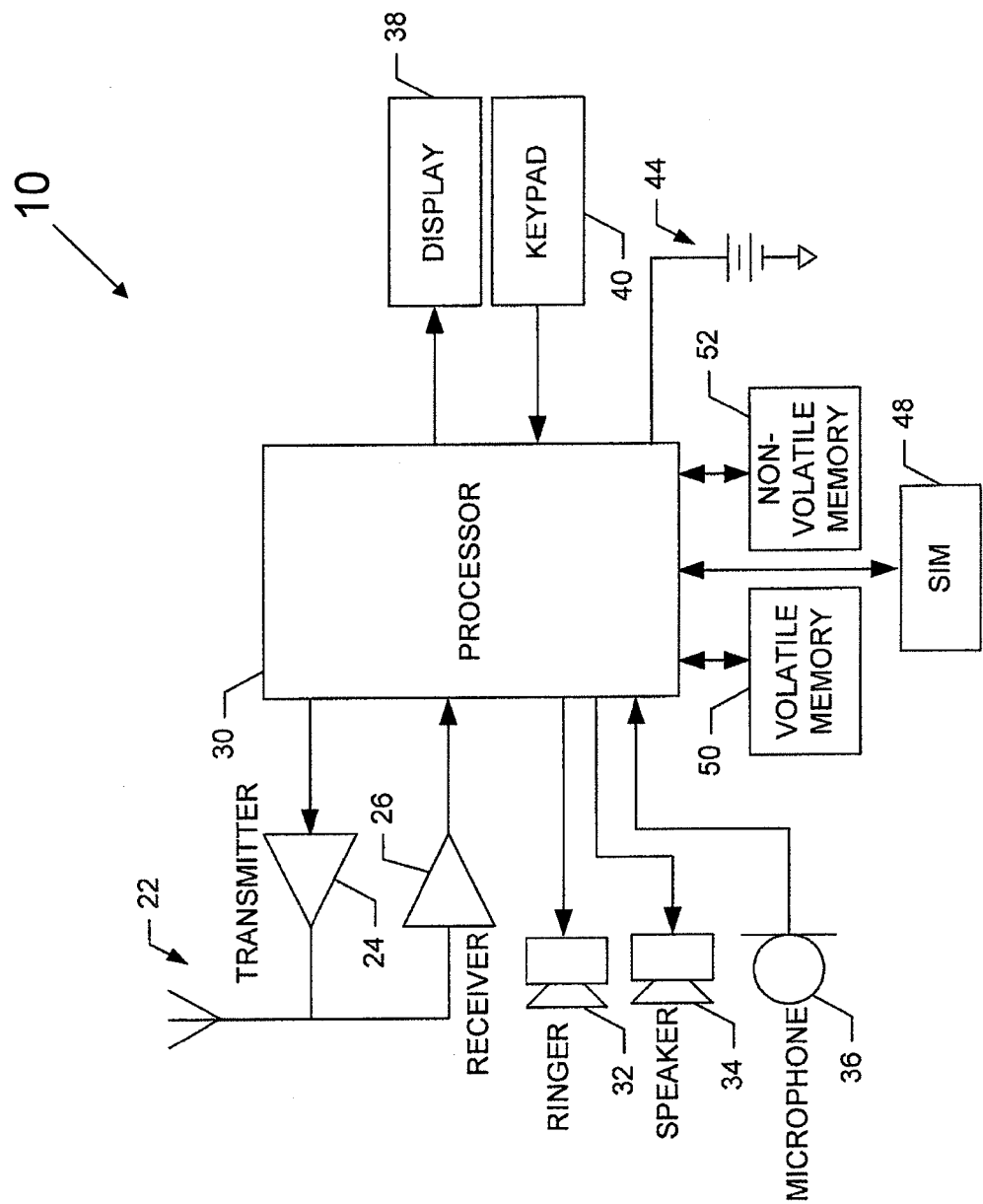
FIG. 2 is a block diagram of a mobile device, according to one embodiment of the present invention.

Although the mobile device 10 may be configured in various manners, one example of a mobile device that could benefit from embodiments of the invention is depicted in the block diagram of FIG. 2. While one embodiment of a mobile device will be illustrated and hereinafter described for purposes of example, other types of mobile devices, such as portable digital assistants (PDAs), pagers, mobile televisions, gaming devices, all types of computers (e.g., laptops or mobile computers), cameras, audio/video players, radios, or any combination of the aforementioned, and other types of mobile devices, may employ embodiments of the present invention. As described, the mobile device may include various means for performing one or more functions in accordance with embodiments of the present invention, including those more particularly shown and described herein. It should be understood, however, that a mobile device may include alternative means for performing one or more like functions, without departing from the spirit and scope of the present invention.

The mobile device 10 of the illustrated embodiment includes an antenna 22 (or multiple antennas) in operable communication with a transmitter 24 and a receiver 26. The mobile device may further include an apparatus, such as a processor 30, that provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile device may be capable of operating with one or more air interface standards, communication protocols, modulation types, and access types. By way of illustration, the mobile device may be capable of operating in accordance with any of a number of first, second, third and/or fourth-generation communication protocols or the like. For example, the mobile device may be capable of operating in accordance with second-generation (2G) wireless communication protocols IS-136, global system for mobile communications (GSM) and IS-95, or with third-generation (3G) wireless communication protocols, such as universal mobile telecommunications system (UMTS), code division multiple access 2000 (CDMA2000), wideband CDMA (WCDMA) and time division-synchronous code division multiple access (TD-SCDMA), with 3.9G wireless communication protocol such as E-UTRAN (evolved-UMTS terrestrial radio access network), with fourth-generation (4G) wireless communication protocols or the like.

It is understood that the apparatus, such as the processor 30, may include circuitry implementing, among others, audio and logic functions of the mobile device 10. The processor may be embodied in a number of different ways. For example, the processor may be embodied as various processing means such as processing circuitry, a coprocessor, a controller or various other processing devices including integrated circuits such as, for example, an ASIC (application specific integrated circuit), an FPGA (field programmable gate array), a hardware accelerator, and/or the like. In an example embodiment, the processor is configured to execute instructions stored in a memory device or otherwise accessible to the processor. As such, whether configured by hardware or software methods, or by a combination thereof, the processor 30 may represent an entity capable of performing operations according to embodiments of the present invention, including those depicted in FIG. 4, while specifically configured accordingly. The processor may also include the functionality to convolutionally encode and interleave message and data prior to modulation and transmission.

The mobile device 10 may also comprise a user interface that may include an output device such as an earphone or speaker 34, a ringer 32, a microphone 36, a display 38, and a user input interface, which may be coupled to the processor 30. The user input interface, which allows the mobile device to receive data, may include any of a number of devices allowing the mobile device to receive data, such as a keypad 40, a touch display (not shown) or other input device. In embodiments including the keypad, the keypad may include numeric (0-9) and related keys (#, *), and other hard and soft keys used for operating the mobile device. Alternatively, the keypad may include a conventional QWERTY keypad arrangement. The keypad may also include various soft keys with associated functions. In addition, or alternatively, the mobile device may include an interface device such as a joystick or other user input interface. The mobile device may further include a battery 44, such as a vibrating battery pack, for powering various circuits that are used to operate the mobile device, as well as optionally providing mechanical vibration as a detectable output.

The mobile device 10 may further include a user identity module (UIM) 48, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile device may be equipped with memory. For example, the mobile device may include volatile memory 50, such as volatile Random Access Memory (RAM) including a cache area for the temporary storage of data. The mobile device may also include other non-volatile memory 52, which may be embedded and/or may be removable. The non-volatile memory may additionally or alternatively comprise an electrically erasable programmable read only memory (EE-PROM), flash memory or the like. The memories may store any of a number of pieces of information, and data, used by the mobile device to implement the functions of the mobile device. For example, the memories may include an identifier, such as an international mobile equipment identification (IMEI) code, capable of uniquely identifying the mobile device.

Figure 3:
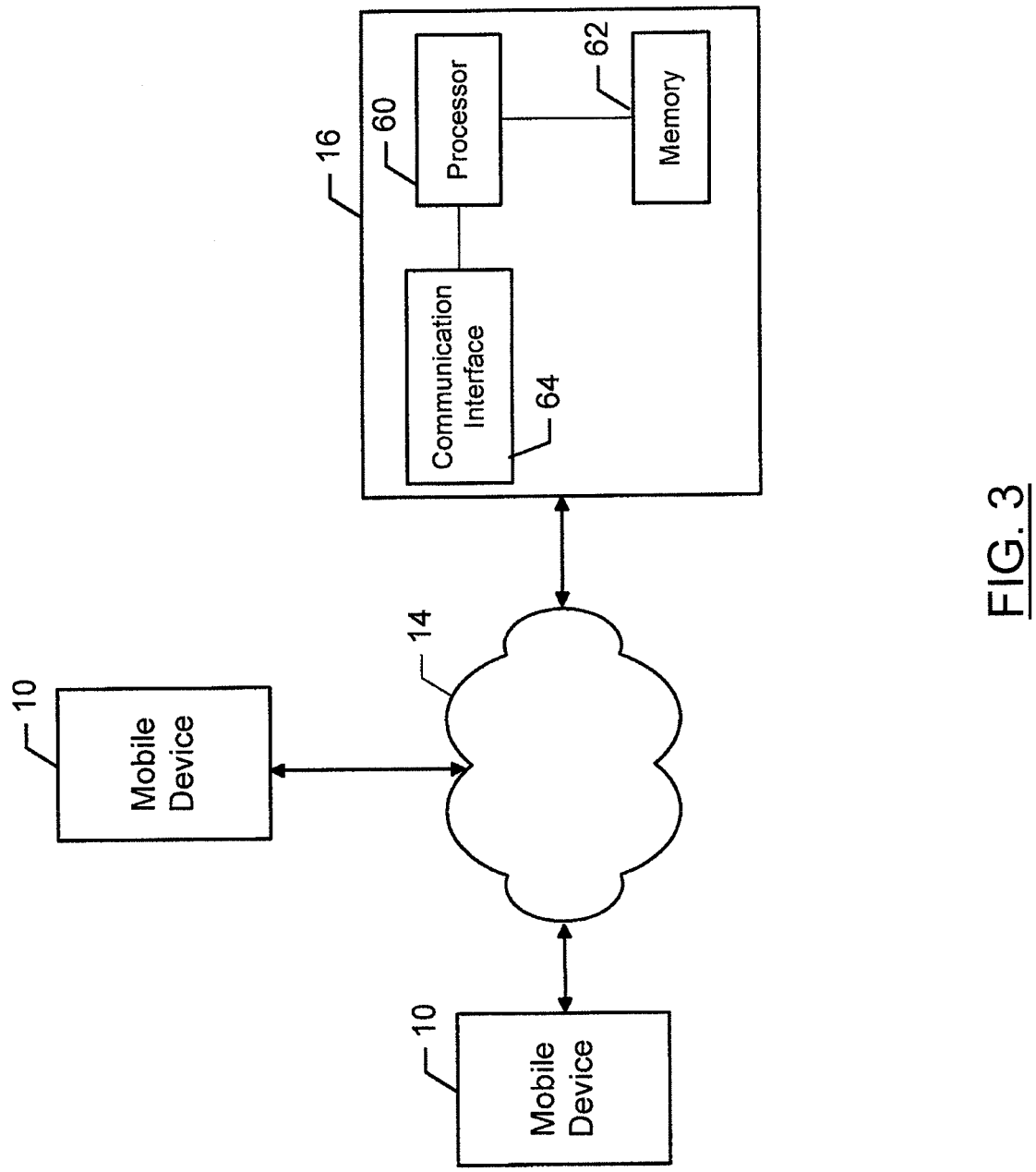
FIG. 3 is a schematic representation of a system for supporting embodiments of the present invention.

The mobile device 10 may be configured to communicate via a network 14 with a network entity 16, such as a server as shown in FIG. 3, for example. The network may be any type of wired and/or wireless network that is configured to support communications between various mobile devices and various network entities. For example, the network may include a collection of various different nodes, devices or functions such as the server, and may be in communication with each other via corresponding wired and/or wireless interfaces. Although not necessary, in some embodiments the network may be capable of supporting communications in accordance with any one of a number of first-generation (1G), second-generation (2G), 2.5G, third-generation (3G), 3.5G, 3.9G, fourth-generation (4G) level communication protocols, long-term evolution (LTE) and/or the like.

As described below, the server 16 may include or be associated with a database that may be accessible by a plurality of mobile devices 10 via the network 14. This database may maintain a plurality of predefined wireless fingerprints, such as previously observed wireless fingerprints (as used by way of example herein), in association with their respective, predefined geographical locations. Based upon an analysis of at least a subset of the information within the database, a mobile device may identify its current location by matching the current wireless fingerprint with a previously observed wireless fingerprint that is associated with a predefined geographical location. In one embodiment, the database is commonly accessible by a plurality of mobile devices. In another embodiment, the database is semi-private with the database only being accessible by a subset of mobile devices, such as the mobile devices of employees of a particular corporation, but not other mobile devices. In yet another embodiment, the database may be private with a mobile device only being able to access the wireless fingerprints that have been contributed by the respective mobile device. As shown in FIG. 3, a block diagram of a network entity 16 capable of operating as a server or the like is illustrated in accordance with one embodiment of the present invention. The network entity may include various means for performing one or more functions in accordance with embodiments of the present invention, including those more particularly shown and described herein. It should be understood, however, that the network entity may include alternative means for performing one or more like functions, without departing from the spirit and scope of the present invention.

In the illustrated embodiment, the network entity 16 includes means, such as a processor 60, for performing or controlling its various functions. The processor may be embodied in a number of different ways. For example, the processor may be embodied as various processing means such as processing circuitry, a coprocessor, a controller or various other processing devices including integrated circuits such as, for example, an ASIC, an FPGA, a hardware accelerator, and/or the like. In an example embodiment, the processor is configured to execute instructions stored in memory or otherwise accessible to the processor. As such, whether configured by hardware or software methods, or by a combination thereof, the processor 60 may represent an entity capable of performing operations according to embodiments of the present invention while specifically configured accordingly.

In one embodiment, the processor 60 is in communication with or includes memory 62, such as volatile and/or nonvolatile memory that stores content, data or the like. For example, the memory may store content transmitted from, and/or received by, the network entity. Also for example, the memory may store software applications, instructions or the like for the processor to perform operations associated with operation of the network entity 16 in accordance with embodiments of the present invention. In particular, the memory may store software applications, instructions or the like for the processor to perform the operations described above and below with regard to FIGS. 10 and 11. In one embodiment, the memory stores the database of previously observed wireless fingerprints in association with their respective, predefined geographical locations.

In addition to the memory 62, the processor 60 may also be connected to at least one interface or other means for transmitting and/or receiving data, content or the like. In this regard, the interface(s) can include at least one communication interface 64 or other means for transmitting and/or receiving data, content or the like, such as between the network entity 16 and the mobile device 10 and/or between the network entity and the remainder of network 14.

In order to determine its location in accordance with an example embodiment, a mobile device 10 may identify the wireless signal present at its current geographical location. In order to identify the wireless fingerprint, the mobile device may scan for wireless signals, such as the wireless signals having a predetermined frequency or within a predetermined range of frequencies. In one embodiment, for example, the processor 30 directs the receiver 26 to capture incoming wireless signals with the receiver itself being configured to receive signals having a predefined frequency or within a range of predefined frequencies. In one embodiment in which the access points 12 of a wireless local area network have been deployed throughout a building such that the wireless fingerprint will be comprised of the wireless signals emitted by the access points, the mobile device may be configured to detect the wireless signals incident at the mobile device at the operational frequency of the access points. Alternatively, in embodiments in which other types of sources are employed that emit wireless signals at other frequencies, the mobile device may be similarly configured to detect wireless signals at the other frequencies of interest.

The wireless fingerprint that is identified by the mobile device 10 may include the received signal strength or other signal parameter for the wireless signals received from each access point in association with the address, such as the media access control (MAC) address, of each access point. With reference to the embodiment of FIG. 4, for example, four signal sources 12, such as four access points, are positioned throughout a portion of a building. Each access point of this embodiment has a unique address, such as 0xa3b, 0x6d2, 0xbc4, and 0x5fe.

Figure 4:
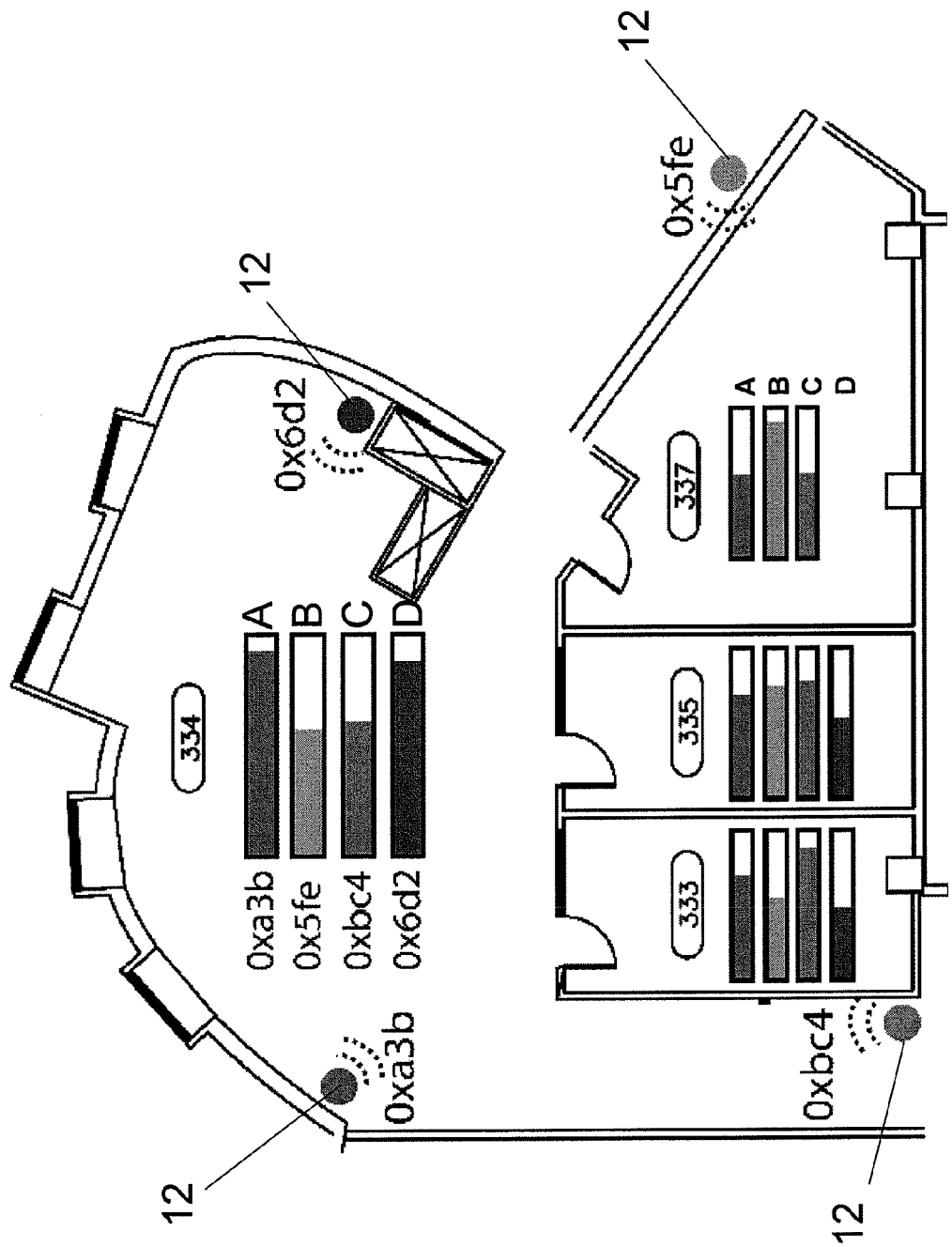
FIG. 4 is a schematic representation of the wireless fingerprints in each of four different spaces.

Because each room or space is differently situated with respect to the signal sources 12, both in terms of distance and in terms of intervening structures, such as walls, doors, windows and the like, the wireless fingerprint received by a mobile device 10 within each space is generally different as shown, for example, in FIG. 4. By associating a particular wireless fingerprint with a specific space, the space in which a mobile device is currently located may be identified by matching the current wireless fingerprint received by the mobile device with the particular wireless fingerprint associated with the space. The first space or region 334 has a fingerprint corresponding to the signal strengths of 0xa3b, 0x5fe, 0xbc4, and 0x6d2, which are identifiers of the four signals available in the illustrated spaces, also identified by (A), (B), (C), and (D) for ease of reference. Each of the signals has a different strength as represented by the corresponding horizontal bars. Each of spaces 333, 335, and 337 also have their own fingerprints with the four signal strengths corresponding to the four signals available. Region 337 shows signal strengths A, B, and C as the strength of signal D is negligible in that particular space. A database of existing wireless fingerprints may be generated through an initial site survey that builds and populates a signal strength map and produces fingerprints of each space. Fingerprints of a particular space may change over time based on reconfiguration, repositioning or replacement of the access points from which the signals are measured for the fingerprints. Additionally, a fingerprint may be altered or revised by using organic user input to augment the database over time. For example, a user that is known to be in a particular space may transmit a fingerprint observed at that space by a user device (e.g., FIG. 3, reference number 10) to a server (e.g., 16), such that the observed fingerprint may replace or augment the fingerprint stored in a database on the server.

Figure 5:
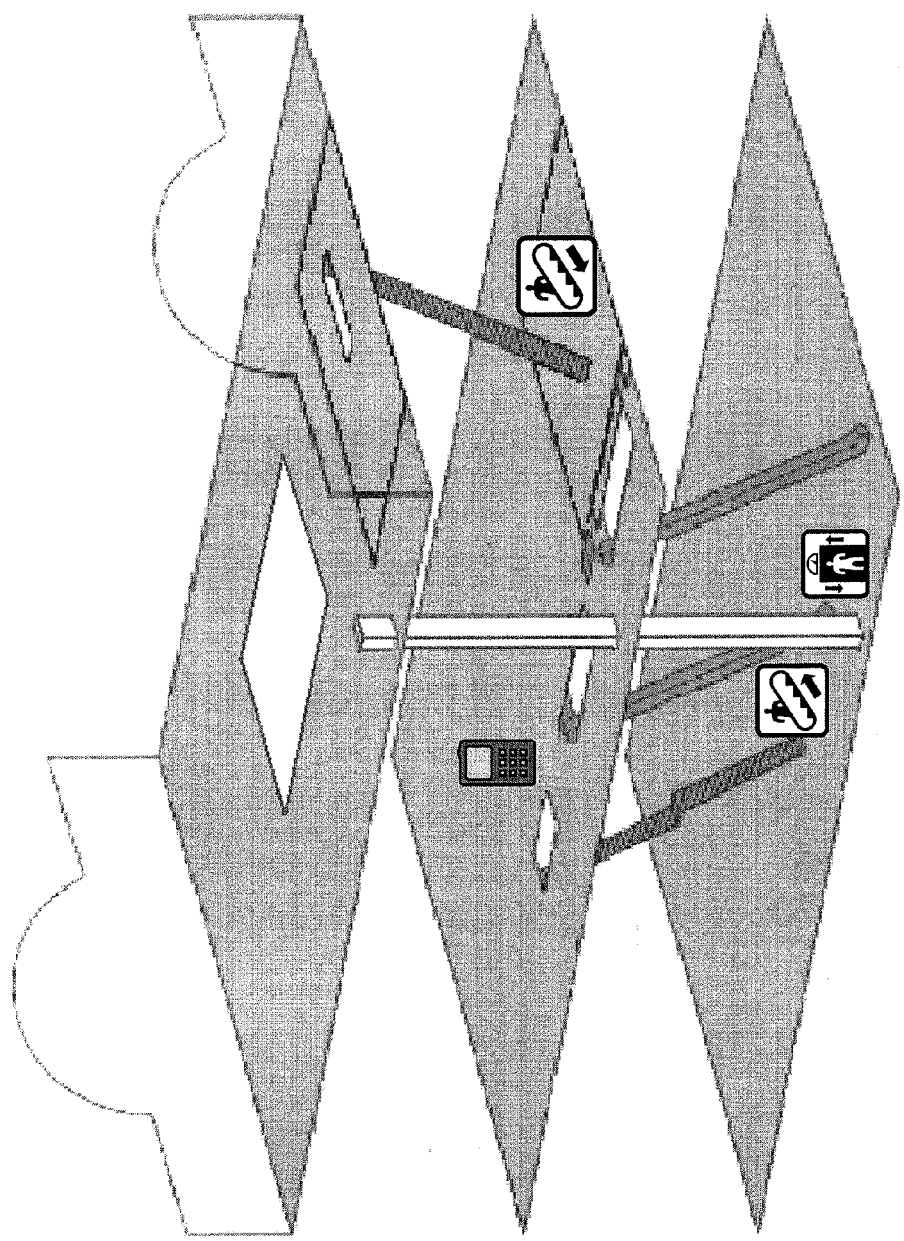
FIG. 5 is an illustration of a representation of a three-dimensional environment according to one embodiment of the present invention.

A device may receive a database of available fingerprints associated with geographic locations upon entering an area, such as a building. The device may be configured to receive a portion of the fingerprints in the database upon the device's first request for location. A map or diagram may also be provided to the device with the portion of the database of fingerprints such that a visualization of the device's location within the environment may be displayed. Such a map or diagram may be a two-dimensional floor plan layout, as shown in FIG. 4, or it may be a three-dimensional representation of a building or area as illustrated in FIG. 5. The location of a device may be presented to a user by displaying a map, and a circle or shape within that map that represents the possible location of the device. The circle may be a very small area, indicating a high certainty of location, or a larger circle, relative to the map, that indicates that the device is within the circle, but exact location is perceived as the center of the circle (e.g., the device position is most likely the center of the circle and probability decreases towards the outer edge of the circle). This method of representing location is well suited for location representation in a two-dimensional map of an environment.

The embodiment of FIG. 4 illustrates an environment that permits relatively accurate location determination through fingerprints; however, in environments without the walls and barriers shown in FIG. 4, or environments with relatively few distinct signal sources or access points, location determination accuracy may be considerably lower. Example environments that may be susceptible to low-accuracy localization systems include airports, shopping malls, parking structures, and stadiums among others. The example embodiment of FIG. 5 illustrates such an environment that may correlate to a shopping mall with numerous floors, large common areas, and multi-story atriums. Such environments may include access points that are visible in open spaces from 100 meters away with a clear line-of-site from the device to the access point; however, the same access point may not be visible in an area that is only 50 meters away but is situated around a corner or is otherwise obstructed. If distance does not correlate well with signal strength, the accuracy of location determination can be significantly degraded. In such environments, it may be difficult to determine an accurate location within a single floor and, moreover, it may be difficult to ascertain which floor a device may be on.

Off-device positioning may also be performed according to embodiments of the present invention where a device 10 sends a location request to an access point or server 16. The server may query available access points regarding signals observed from the mobile device and their respective strengths to estimate the distance to each of the available access points. Based upon the distances from available access points, the device location may be triangulated within a certain degree of accuracy that is dependent upon how accurate the distance-to-access point estimates are.

Figure 6:
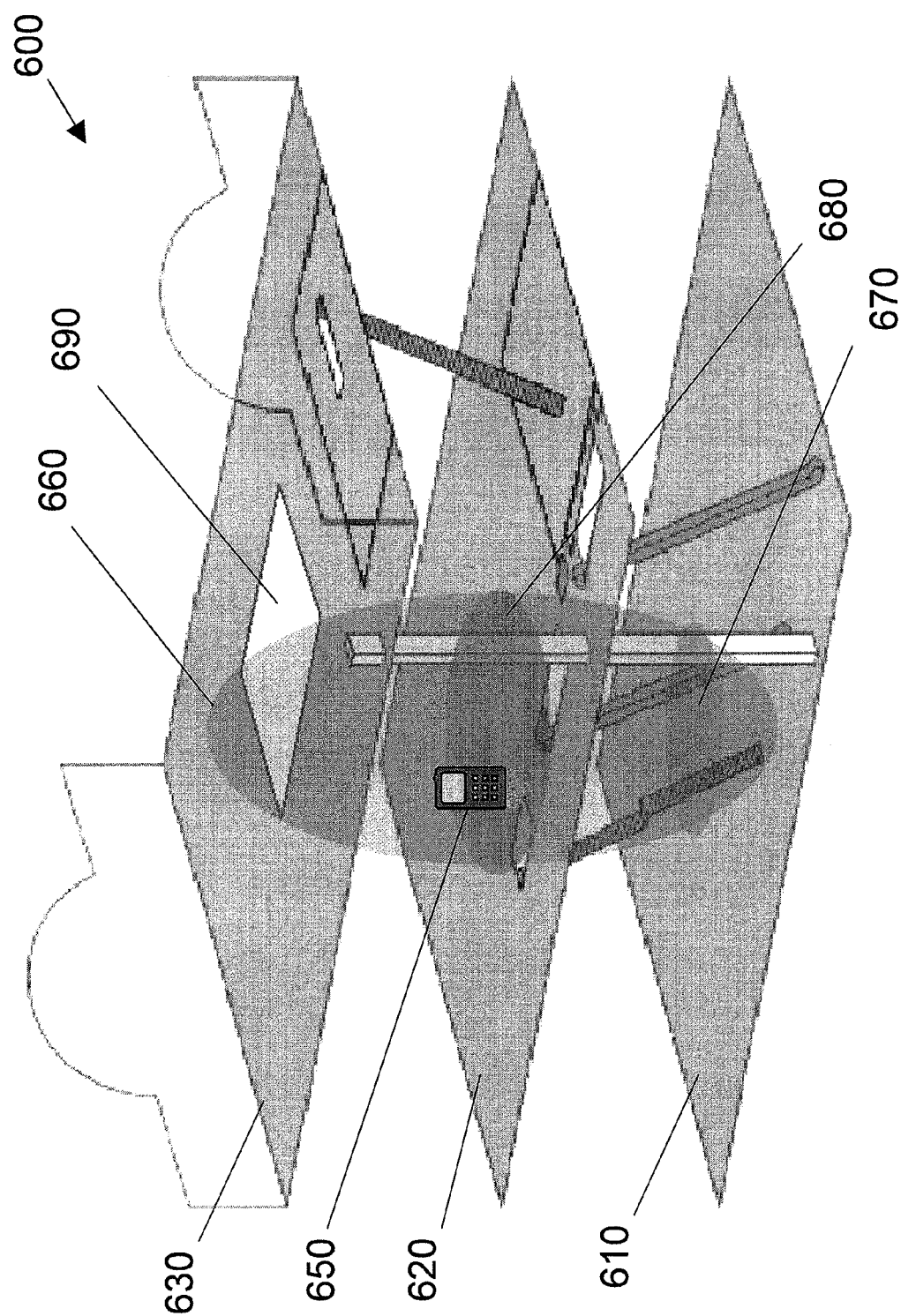
FIG. 6 is an illustration of a representation of a three-dimensional environment including location estimations according to an example embodiment of the present invention.

FIG. 6 is an illustration of an example embodiment of the present invention in which a mobile device 650 is on the second floor 620 of a building 600. The access points (not shown) visible to the mobile device 650 may suggest that the mobile device may be located on the first floor 610, the second floor 620, or the third floor 630 as illustrated by the area indication 660. The area indication 660 may be similar to an area indication used in outdoor, GPS type locating in which the area indication is drawn around the area in which a device may be located; however, in GPS locating in outdoor environments, a two-dimensional area indication may be sufficient to represent the likely location of a device. In a multi-story building environment, two-dimensional location may be insufficient as two devices that appear to be in the same location in two-dimensions may actually be on different floors. The area indication 660 of FIG. 6 may be a three-dimensional 'cloud' where the device is located somewhere within the area indication. The device 650 location is shown for illustrative purposes and may not be present in a display that is estimating the location using the area indication 660.

The three-dimensional area indication 660 of FIG. 6 may not provide the necessary location accuracy for some services of a device that uses location. As such, the area indication 660 may further include an indication of likelihood of more specific locations, such as an indication of which floor a device is most likely to be on. The area indication 660 of FIG. 6 also includes areas of differing opacity (670, 680) to indicate the probability that a device is within a particular region of the area indication 660. In the illustrated embodiment, a high-opacity 680 region may indicate a high likelihood of probable location while a low-opacity 670 region may indicate a low likelihood of probable location. Area 680 of FIG. 6 with a higher opacity than area 670 may indicate that a device is more likely to be in area 680, on the second floor 620 of the building 600. In the example embodiment, the higher the opacity, the higher the probability that the device is actually located there. The area indication 660 of FIG. 6 indicates that the device may be located on any one of the first, second, or third floors, but the regions within the area indication (670, 680) further define where the device is more likely to be. The lack of an opacity region on the third floor of the illustrated embodiment may indicate that there is a low likelihood of the device being located on the third floor. This may be determined by the estimated location of the device, or the device may be aware that a significant portion of the area of the third floor that the area indication 660 suggests may be a possible location is actually an open area 690, with no floor, thus a device is highly unlikely to be there.

While varying opacity is illustrated in FIG. 6 to represent different levels of probability that a device is within a particular area, other methods of differentiating the areas may be used. Alternative methods may include varying colors, varying patterns, varying shapes, alpha-numeric indicators, etc. Additionally, numerical indicators such as a percentage may be used to indicate the certainty with which a device may be in a particular location.

The illustrated embodiment of FIG. 6 may be presented to a user of the device 650 on the display of the device such that a user of the device may be able to ascertain their location within the environment. As noted above, a diagram of the environment may be retrieved by the device or sent to the device when it enters the environment or upon the first request for location from the device. The three-dimensional representation of the environment may be provided to provide a user with an estimation of their location, and the user may be able to confirm their location within the displayed environment by selecting which area they actually are in, if it is known to the user. A user may understand that they are on the second floor of a building, but not know where they are with respect to that floor. In such a case, the user may select the floor from the displayed environment and the device may then display a two-dimensional (or three-dimensional) map or diagram of the floor that they are on with more detail and/or accuracy. If a user is not aware of what floor they may be on, the user may review the diagram provided on the display of the device and they may select their floor based on probability of location, or alternatively on structures that are visible in both the environment displayed on the device and visible to the user in the environment, such as an open area 690. If a user of the device 650 of the example embodiment of FIG. 6 views the environment of FIG. 6 on the display of the device, they may note that they can see the open area 690 above them, and thus they must be on the second floor 620.

Figure 7:
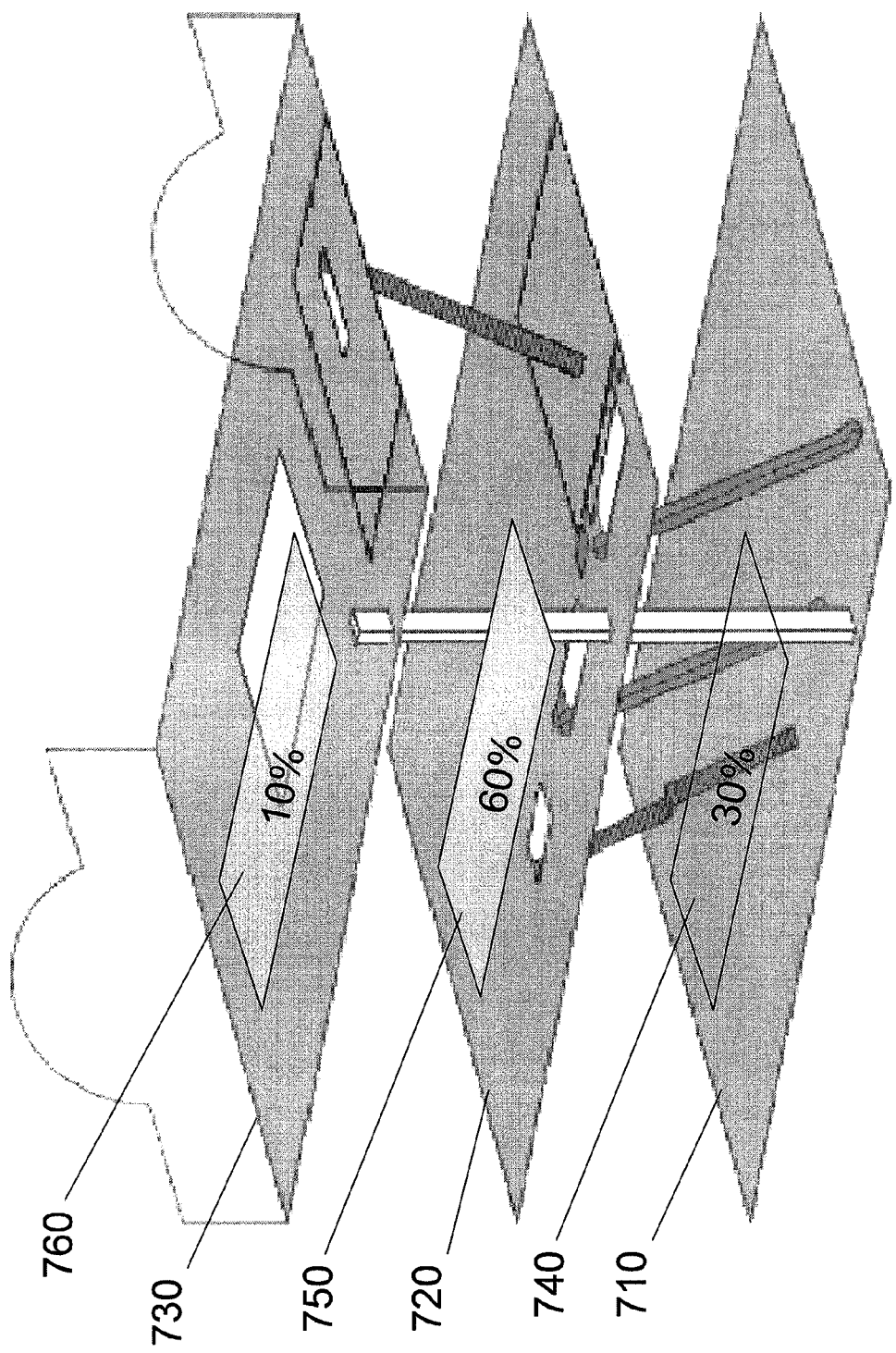
FIG. 7 is an illustration of a representation of a three-dimensional environment including location estimations according to another example embodiment of the present invention.

Another example embodiment of the present invention is illustrated in FIG. 7, in which an optional method is illustrated for representing potential locations within an environment as may be shown on the display of a device. As illustrated, there are three floors 710, 720, and 730. The areas highlighted on each floor 740, 750, 760 represent possible locations for a mobile device. The areas may be of differing colors and they may include a numerical representation of the likelihood that a device is in that area, such as 60% likelihood as illustrated in area 750. An overall area identification 660 as shown in FIG. 6 may be displayed encompassing all of the highlighted areas.

The display of an uncertain location may be based on predefined confidence levels. For example, if a device is able to determine its location on a particular level of a building with a 90% confidence level or certainty, the user of the device may not be shown a diagram of the building with the probable location as the assumed location is most likely correct.

When the user of a device selects the level they are on according to the aforementioned example embodiments, the selection of that level may also provide feedback to the server that stores fingerprints associated with geographic locations. The fingerprint of the user's device, together with the location indicated by the user, may be correlated and stored, or incorporated into the fingerprint database. Multiple fingerprints from the same location, as indicated by users, may be combined to form an average fingerprint.

Figure 8:
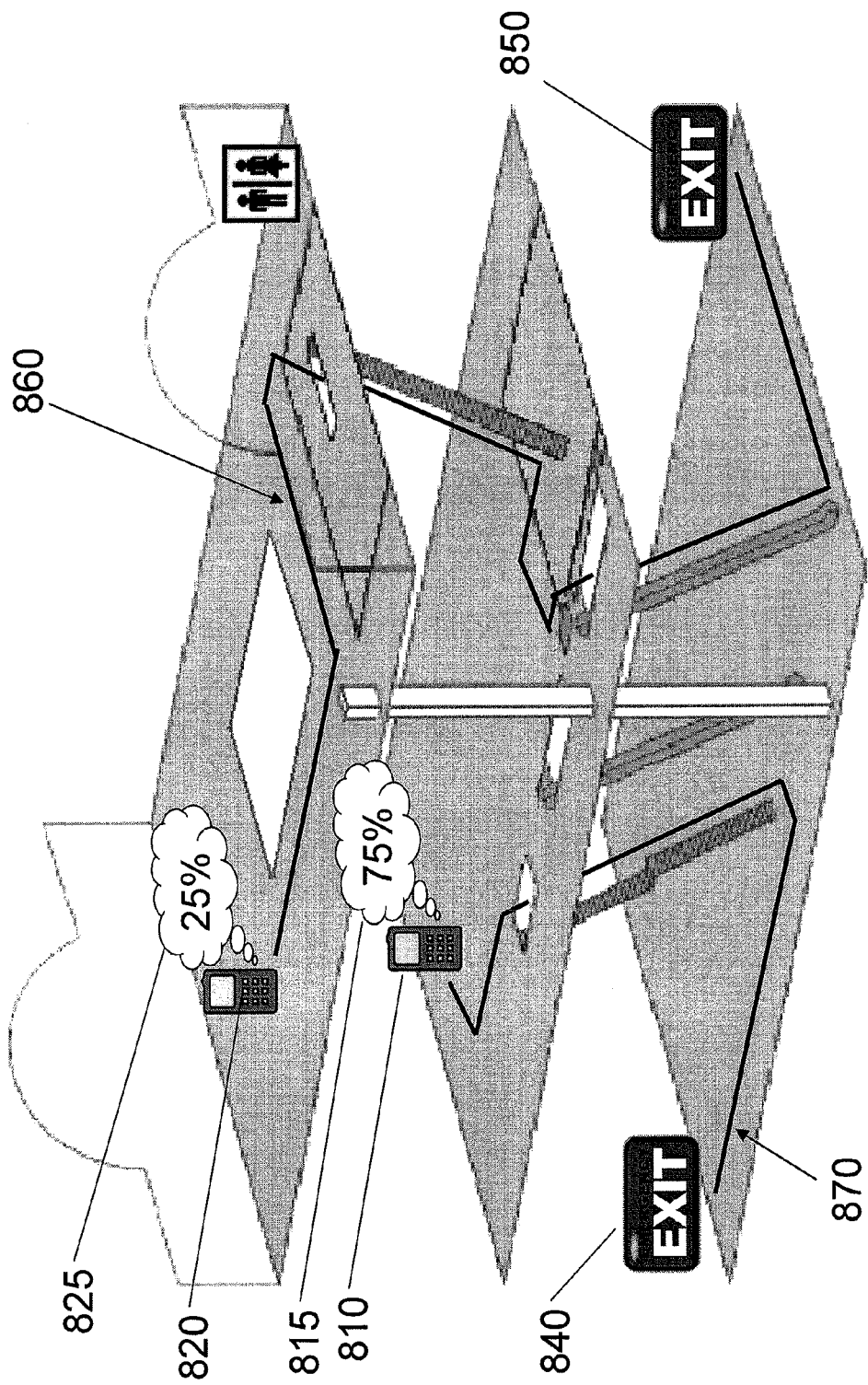
FIG. 8 is an illustration of a representation of a three-dimensional environment including location estimations and path routing according to an example embodiment of the present invention.

The aforementioned ways in which a user may determine their location using a mobile device may be beneficial for purposes of navigation or other location based services. An example embodiment of the utility of the present invention may be in determining the best route to an emergency exit or a toilet facility within a building. The user of the device of the embodiment illustrated in FIG. 8 may enter a request for the closest exit 840, 850. The service that provides the routes may note an uncertainty in the location of the user device such that the display may show a diagram similar to that illustrated in FIG. 8. The displayed diagram may show two or more potential device locations by any one of the aforementioned methods, including colored, shaded, or opaque zones, areas with a confidence level, or icons 810, 820 among others. The icons of FIG. 8 include a notation of the confidence level for each location 815, 825. The locating service of the device of the example embodiment indicates that there is a 75% likelihood that the device is on the second floor, and a 25% likelihood that the device is on the third floor. The routing service may provide suggested routes 860, 870 from both of the potential locations of the device such that the user has an opportunity to select a location or to proceed to the path that they recognize as correct. If the user does select one of the two available device locations 810, 820, or one of the two paths 860, 870 to follow, the selection may cause the three-dimensional rendering of the building to revert to a two-dimensional map for ease of navigation, or the user may choose for the device to continue to display the three-dimensional rendering. Reverting to a two dimensional map may be beneficial as the two-dimensional map may be able to show walls, obstacles, and points of interest with more clarity and detail than would be available in the three-dimensional view.

Figure 9:
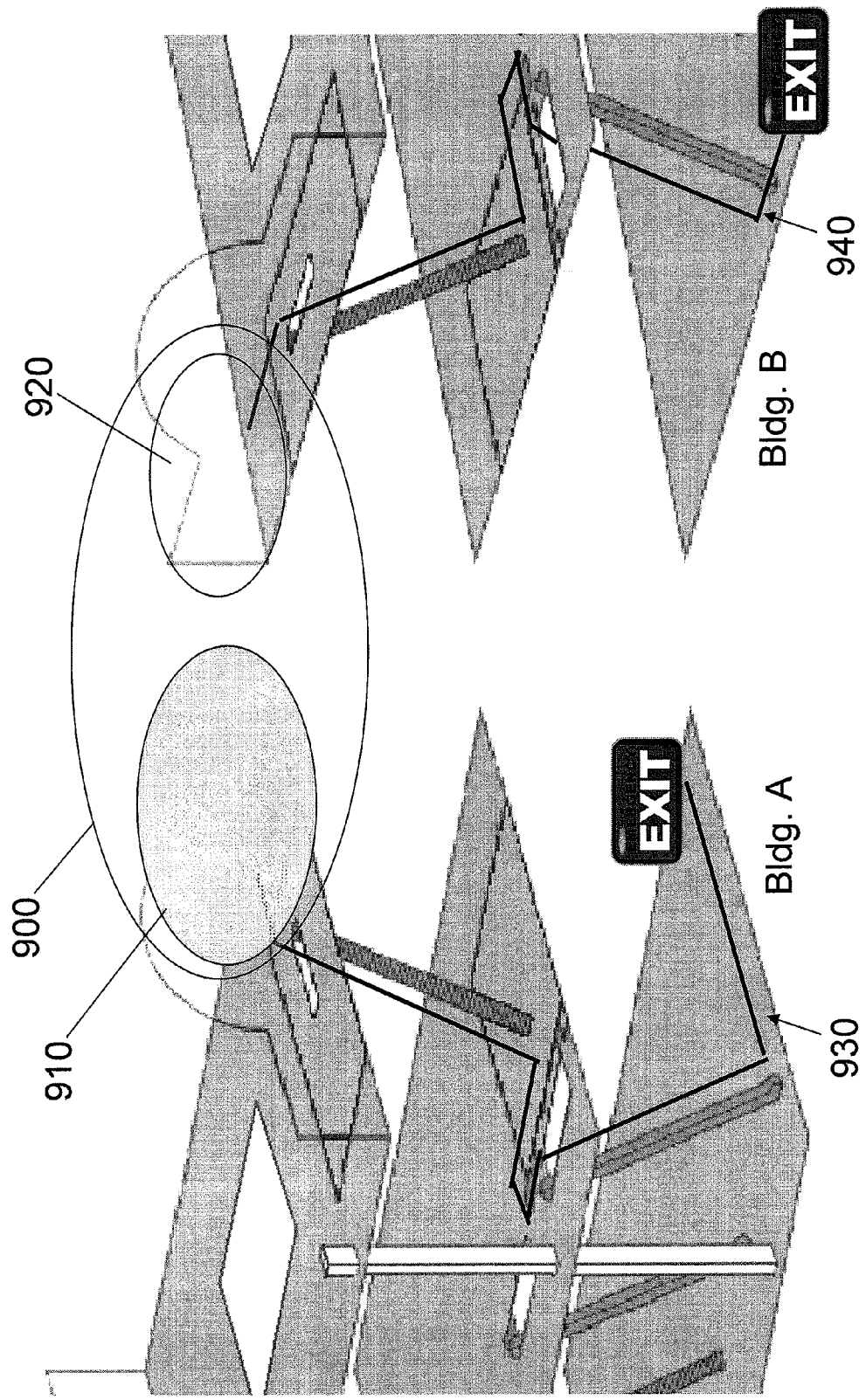
FIG. 9 is an illustration of a representation of a three-dimensional environment including two buildings and location estimations according to an example embodiment of the present invention.

FIG. 9 is an illustration of another example embodiment of the present invention, wherein a wireless fingerprint or off-device location estimate may indicate that a device is in one of two buildings, which may occur on a college campus or a large shopping complex. In the illustrated embodiment, an area indication 900 is shown that encompasses portions of Building A and Building B. Section indicators 910 and 920 indicate where in each building the device may be, with section indicator 910 being larger and of a higher opacity, indicating a higher likelihood of accuracy. In the illustrated embodiment, the exit routes 930 and 940 are also displayed for each of Buildings A and B from each of the respective locations, such that a user of the device may select the building they are in to proceed along the correct route.

Figure 10:
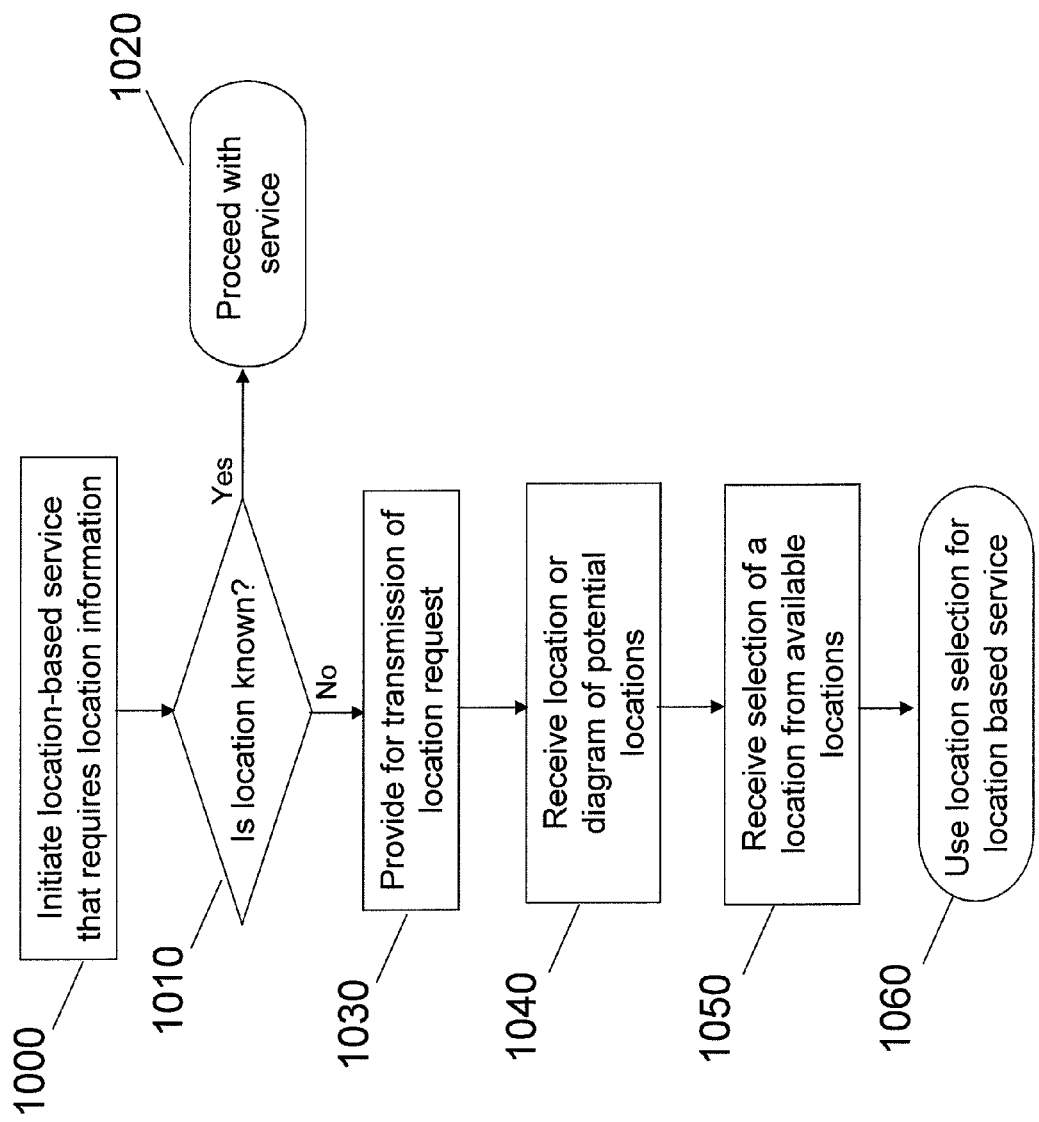
FIG. 10 is a flow chart of the operations performed in accordance with one embodiment of the present invention.

FIG. 10 is a flowchart of a method according to an example embodiment of the present invention. A device may initiate a service that requires location awareness at block 1000. The service may be initiated by user direction, by an automated, scheduled initiation, or by another means. The service may then determine if the location is known by the device at block 1010. The service may require that the location of the device is requested each time the service is initiated or the service may accept an existing, known location if it is recent enough. The location of the device may be determined by the device performing a scan of the available access points to obtain a fingerprint specific to the location of the device. If the fingerprint received matches that of one that the device has in a local memory, it may accept the location associated with that fingerprint as the location of the device and proceed to block 1020 of the flowchart. If the fingerprint does not correspond to a fingerprint in the memory of the device, the device may request an update to its fingerprint database through an access point, or the device may send the fingerprint through the access point to request a location in return at block 1030. If the fingerprint transmitted by the device to a server does not correspond to a specific location within the server, the server may return a map or diagram that includes possible device locations at block 1040. The device may have already received a map or diagram with the database of fingerprints, in which case the server may simply return location estimations for inclusion on the map or diagram for presentation to a user. The user may then view the diagram and select the location at block 1050 and the selected location may be used for the location-based service(s) at block 1060.

The flowchart of FIG. 10 may also be used in a method according to an example embodiment of the present invention using off-device localization. The device may initiate a service that requires location awareness at block 1000. The service may then determine if the location of the device is known, for example if the location was estimated and confirmed very recently at block 1010. If the location is known by the device, the service may proceed at block 1020. If the location is not known, the device may transmit a request for a location estimate at block 1030. The access point(s) and/or server may then transmit a location estimate back to the device that is received at block 1040. Optionally, the server may transmit a graphical representation of the environment of the device including graphical representations of each of the potential locations at block 1040. If the location estimate is of a confidence level below a threshold value, the device may present a diagram of potential locations to the user of the device. The user may then select the location at block 1050 such that the location based service may use the selected location for the service at block 1060.

Figure 11:
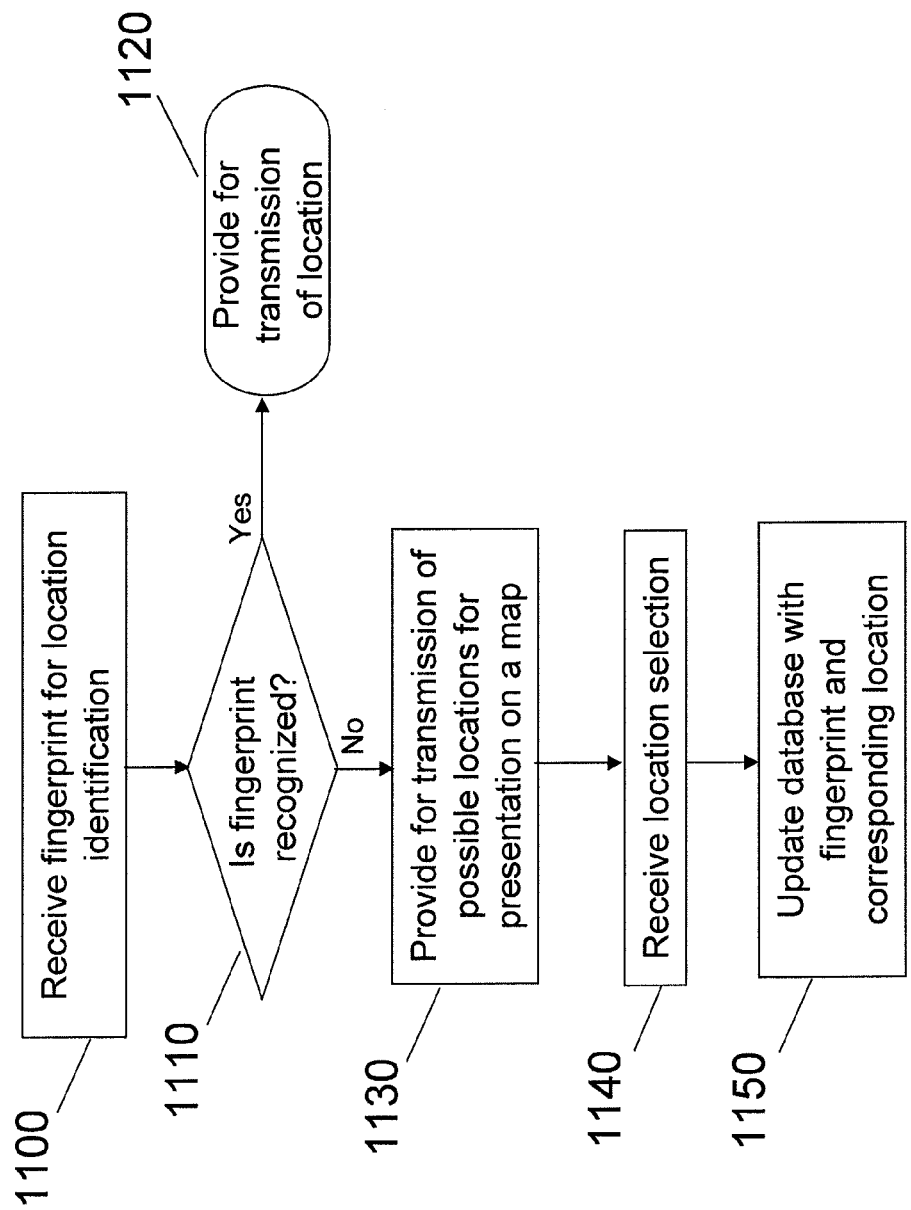
FIG. 11 is a flow chart of the operations performed in accordance with another embodiment of the present invention.

FIG. 11 is a flowchart of a method according to an example embodiment of the present invention. A server may receive a fingerprint or a request for location identification from a device at block 1100. The server may then determine if the fingerprint is recognized (e.g., does the fingerprint correspond with a known, specific location) at block 1110. If the fingerprint corresponds to a known location, the location is transmitted at block 1120. If the fingerprint is not known to correspond to a specific location, a number of locations that may correspond to the fingerprint are transmitted at block 1130 for presentation to a user on a map or diagram. A selection may be received at block 1140 in response to the transmission, correlating a specific location with the fingerprint originally received. At block 1150, the server may update a database to include the fingerprint and correlated selected location for future reference and to improve the accuracy with which a location may be estimated by the server.

As described above, FIGS. 10 and 11 are flowcharts of an apparatus, method and program product according to some exemplary embodiments of the invention. It will be understood that each block of the flowcharts, and combinations of blocks in the flowcharts, can be implemented by various means, such as hardware, firmware, and/or computer program product including one or more computer program instructions. For example, one or more of the procedures described above may be embodied by computer program instructions. In this regard, the computer program instructions which embody the procedures described above may be stored by a memory device, such as 50, 52, or 62, of a mobile device 10, network entity such as a server 16 or other apparatus employing embodiments of the present invention and executed by a processor 30, 60 in the mobile device, server or other apparatus. In this regard, the operations described above in conjunction with the diagrams of FIGS. 10 and 11 may have been described as being performed by the communications device and a network entity such as a server, but any or all of the operations may actually be performed by the respective processors of these entities, for example in response to computer program instructions executed by the respective processors. As will be appreciated, any such computer program instructions may be loaded onto a computer or other programmable apparatus (e.g., hardware) to produce a machine, such that the instructions which execute on the computer (e.g., via a processor) or other programmable apparatus implement the functions specified in the flowchart block(s). These computer program instructions may also be stored in a computer-readable memory, for example, memory 62 of server 16, that can direct a computer (e.g., the processor or another computing device) or other apparatus to function in a particular manner, such that the instructions stored in the computer-readable memory produce an article of manufacture including instructions which implement the functions specified in the flowcharts block(s). The computer program instructions may also be loaded onto a computer or other apparatus to cause a series of operations to be performed on the computer or other apparatus to produce a computer-implemented process such that the instructions which execute on the computer or other programmable apparatus provide operations for implementing the functions specified in the flowcharts block(s).

Accordingly, blocks of the flowcharts support combinations of means for performing the specified functions, combinations of operations for performing the specified functions and program instructions for performing the specified functions. It will also be understood that one or more blocks of the flowcharts, and combinations of blocks in the flowcharts, can be implemented by special purpose hardware-based computer systems which perform the specified functions, operations, or combinations of special purpose hardware and computer instructions.

In an exemplary embodiment, an apparatus for performing the methods of FIG. 4 may include a processor (e.g., the processor(s) 30 and/or 60) configured to perform some or each of the operations (1000-1060 and/or 1100-1150) described above. The processor(s) may, for example, be configured to perform the operations (1000-1060 and/or 1100-1150) by performing hardware implemented logical functions, executing stored instructions, or executing algorithms for performing each of the operations. Alternatively, the apparatus, for example server 16, may comprise means for performing each of the operations described above. In this regard, according to an example embodiment, examples of means for performing operations 1000-1060 and/or 1100-1150 may comprise, for example, the processor(s) 30 and/or 60 as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although the mobile device 10 has been described as determining whether the wireless fingerprint corresponds to a previously observed wireless fingerprint, requesting and receiving an identification of the geographical location and associating the wireless fingerprint with the identification of the geographical location, a network entity 16, such as the server, may perform some or all of these operations and may then provide the current location to the mobile device for use, for example, in appropriately configuring and/or executing various applications. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving, at a device at a first location within an environment, at least two potential locations of a current position of the device that are within the environment in an instance in which the first location is uncertain, wherein the environment comprises at least two levels of a multi-level environment, and wherein at least two of the at least two potential locations are on different levels;
   providing for display of a graphical representation of the environment including a visual indicator for each of the potential locations within the graphical representation of the environment;
   establishing a route to a respective destination from each of the potential locations within the graphical representation of the environment;
   providing for display of at least a portion of the route to the respective destination from each of the potential locations within the graphical representation of the environment;
   receiving an indication that one of the at least two potential locations corresponds to a correct position of the first location; and
   providing for display of a revised graphical representation of the environment including a visual indicator of the correct position of the first location and at least a portion of the route to the respective destination from the correct position in response to receiving the indication.

2. The method according to claim 1, wherein the at least two potential locations of the device are established in response to receiving a wireless fingerprint corresponding to the first location.

3. The method according to claim 1, wherein each of the visual indicators for each of the potential locations comprises at least one visual cue that represents a confidence level for each of the respective potential locations.

4. The method of claim 3, wherein the visual cue comprises at least one of a color saturation, a contrast, or a transparency of the visual indicator.

5. The method according to claim 1, wherein the revised graphical representation of the environment comprises a single level view of the environment.

6. The method of claim 1, wherein the at least two potential locations of the device within the environment are received in response to the initiation of a location-based service, wherein the location-based service benefits from the establishment of a device location.

7. The method of claim 1, wherein the respective destinations for each of the potential locations within the graphical representation of the environment are different.

8. The method of claim 1, wherein the revised graphical representation of the environment does not include a visual indicator for any of the potential locations not indicated as the correct position of the first location.

9. An apparatus comprising at least one processor and at least one memory including computer program code, the at least one memory and the computer program code configured to, with the at least one processor, cause the apparatus to:
receive at least two potential locations of a current position of the apparatus that are within an environment, the apparatus being at a first location, in an instance in which the first location is uncertain, wherein the environment comprises at least two levels of a multi-level environment, and wherein at least two of the at least two potential locations are on different levels;
provide for display of a graphical representation of the environment including a visual indicator for each of the potential locations within the graphical representation of the environment;
establish a route to a respective destination from each of the potential locations within the graphical representation of the environment;
provide for display of at least a portion of the route to the respective destination from each of the potential locations within the graphical representation of the environment;
receive an indication that one of the at least two potential locations corresponds to a correct position of the first location; and
provide for display of a revised graphical representation of the environment including a visual indicator of the correct position of the first location and at least a portion of the route to the respective destination from the correct position in response to receiving the indication.

10. The apparatus according to claim 9, wherein the at least two potential locations of the device are established in response to receiving a wireless fingerprint corresponding to the first location.

11. The apparatus according to claim 9, wherein each of the visual indicators for each of the potential locations comprises at least one visual cue that represents a confidence level for each of the respective potential locations.

12. The apparatus of claim 11, wherein the visual cue comprises at least one of a color saturation, a contrast, or a transparency of the visual indicator.

13. The apparatus according to claim 9, wherein the revised graphical representation of the environment comprises a single level view of the environment.

14. The apparatus of claim 9, wherein the at least two potential locations of the device within the environment are received in response to the initiation of a location-based service, wherein the location-based service benefits from the establishment of a device location.

15. The apparatus of claim 9, wherein the respective destinations for each of the potential locations within the graphical representation of the environment are different.

16. The apparatus of claim 9, wherein the revised graphical representation of the environment does not include a visual indicator for any of the potential locations not indicated as the correct position of the first location.

17. A computer program product comprising at least one non-transitory computer-readable storage medium having computer-executable program code instructions stored therein, the computer-executable program code instructions comprising:
program code instructions for receiving, at a device at a first location within an environment, at least two potential locations of a current position of the device that are within the environment in an instance in which the first location is uncertain, wherein the environment comprises at least two levels of a multi-level environment, and wherein at least two of the at least two potential locations are on different levels;
program code instructions for providing for display of a graphical representation of the environment including a visual indicator for each of the potential locations within the graphical representation of the environment;
program code instructions for establishing a route to a respective destination from each of the potential locations within the graphical representation of the environment;
program code instructions for providing for display of at least a portion of the route to the respective destination from each of the potential locations within the graphical representation of the environment;
program code instructions for receiving an indication that one of the at least two potential locations corresponds to a correct position of the first location; and
program code instructions providing for display of a revised graphical representation of the environment including a visual indicator of the correct position of the first location and at least a portion of the route to the respective destination from the correct position in response to receiving the indication.

18. The computer program product according to claim 17, wherein the at least two potential locations of the device are established in response to receiving a wireless fingerprint corresponding to the first location.

19. The computer program product according to claim 17, wherein each of the visual indicators for each of the potential locations comprises at least one visual cue that represents a confidence level for each of the respective potential locations.

20. The computer program product according to claim 19, wherein the at least one visual cue includes the color of the visual indicator.

21. The computer program product of claim 19, wherein the visual cue comprises at least one of a color saturation, a contrast, or a transparency of the visual indicator.

22. The computer program product of claim 17, wherein the revised graphical representation of the environment comprises a single level view of the environment.

23. The computer program product of claim 17, wherein the at least two potential locations of the device within the environment are received in response to the initiation of a location-based service, wherein the location-based service benefits from the establishment of a device location.

24. The computer program product of claim 17, wherein the respective destinations for each of the potential locations within the graphical representation of the environment are different.

25. The computer program product of claim 17, wherein the revised graphical representation of the environment does not include a visual indicator for any of the potential locations not indicated as the correct position of the first location.

* * * * *